(12) United States Patent
Kuriyama

(10) Patent No.: US 12,220,779 B2
(45) Date of Patent: Feb. 11, 2025

(54) CUTTING TOOL, CUTTING TOOL HOLDER, TOOL SYSTEM, AND COMMUNICATION METHOD

(71) Applicant: Sumitomo Electric Industries, Ltd., Osaka (JP)

(72) Inventor: Hiromitsu Kuriyama, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 515 days.

(21) Appl. No.: 17/624,843

(22) PCT Filed: Jul. 22, 2020

(86) PCT No.: PCT/JP2020/028530
§ 371 (c)(1),
(2) Date: Jan. 5, 2022

(87) PCT Pub. No.: WO2021/029202
PCT Pub. Date: Feb. 18, 2021

(65) Prior Publication Data
US 2022/0266348 A1    Aug. 25, 2022

(30) Foreign Application Priority Data
Aug. 9, 2019 (JP) .................. 2019-147386

(51) Int. Cl.
*B23Q 17/00* (2006.01)
*B23Q 17/09* (2006.01)
*B23B 29/12* (2006.01)

(52) U.S. Cl.
CPC ......... *B23Q 17/09* (2013.01); *B23Q 17/0966* (2013.01); *B23Q 17/0971* (2013.01); *B23B 29/12* (2013.01); *B23B 2260/128* (2013.01)

(58) Field of Classification Search
CPC ... B23B 2260/128; B23B 29/12; B23Q 17/09; B23Q 17/0966; B23Q 17/0971
See application file for complete search history.

(56) References Cited

U.S. PATENT DOCUMENTS

| | | | |
|---|---|---|---|
| 2002/0083805 A1* | 7/2002 | Lundblad | B23Q 11/0039 82/163 |
| 2006/0085092 A1 | 4/2006 | Redecker et al. | |
| 2018/0311779 A1 | 11/2018 | Ziegltrum et al. | |
| 2019/0001456 A1* | 1/2019 | Kalhori | B23Q 17/0952 |
| 2019/0176243 A1* | 6/2019 | Fenollosa | H03K 17/964 |
| 2022/0143710 A1* | 5/2022 | Hashimoto | B23B 27/14 |
| 2022/0274183 A1* | 9/2022 | Hashimoto | B23Q 17/0985 |

FOREIGN PATENT DOCUMENTS

| | | | | |
|---|---|---|---|---|
| GB | 2577077 A | * | 3/2020 | ............ B23B 27/00 |
| JP | 2014-46407 A | | 3/2014 | |
| JP | 2015-200941 A | | 11/2015 | |
| JP | 5822441 B2 | | 11/2015 | |
| JP | 2018-103286 A | | 7/2018 | |
| JP | 2018-535105 A | | 11/2018 | |

* cited by examiner

*Primary Examiner* — Alan Snyder
(74) *Attorney, Agent, or Firm* — XSENSUS LLP

(57) ABSTRACT

A cutting tool includes a cutting insert having a cutting edge; a holder holding the cutting insert; a sensor provided in the holder; and an information communication circuitry that is provided in the holder, transmits an inquiry for parameter information related to measurement by the sensor to a management device provided outside the cutting tool, and acquires the parameter information from the management device.

6 Claims, 8 Drawing Sheets

CUTTING TOOL, CUTTING TOOL HOLDER, TOOL SYSTEM, AND COMMUNICATION METHOD

CROSS-REFERENCE TO RELATED APPLICATIONS

The present application is based on PCT filing PCT/JP2020/028530, filed Jul. 22, 2020, and claims priority to Japanese Application No. 2019-147386, filed Aug. 9, 2019, the entire contents of each are incorporated herein by reference.

TECHNICAL FIELD

The present disclosure relates to a cutting tool, a cutting tool holder, a tool system, and a communication method.

BACKGROUND ART

PTL 1 (Japanese Unexamined Patent Application Publication No. 2014-46407) discloses a cutting tool described below. That is, the cutting tool includes an edge-processed portion having a region that connects a flank face and a rake face and that has undergone an edge process, and a cutting-edge ridge formed at a boundary between the edge-processed portion and the flank face. The cutting tool includes a groove along the cutting-edge ridge concerned with cutting. The groove is located, in the edge-processed portion, in a region extending from a boundary between the edge-processed portion and the rake face to 90% of a width of the edge-processed portion, the width of the edge-processed portion being the shortest distance between the cutting-edge ridge and the boundary between the edge-processed portion and the rake face, when the cutting tool is viewed in plan view from the rake face side.

CITATION LIST

Patent Literature

PTL 1: Japanese Unexamined Patent Application Publication No. 2014-46407

SUMMARY OF INVENTION

A cutting tool of the present disclosure includes a cutting insert having a cutting edge; a holder holding the cutting insert; a sensor provided in the holder, and an information communication circuitry that is provided in the holder, configured to transmit an inquiry for parameter information related to measurement by the sensor to a management device provided outside the cutting tool, and acquire the parameter information from the management device.

A cutting tool of the present disclosure includes a cutting insert having a cutting edge; a holder holding the cutting insert; a sensor provided in the holder and including at least either one of an acceleration sensor and a strain sensor; a wireless communication chip provided in the holder, configured to transmit an inquiry for parameter information related to measurement by the sensor to a management device provided outside the cutting tool, and acquire the parameter information; a memory that is provided in the holder configured to store the parameter information; and a processor provided in the holder. The wireless communication chip is configured to transmit the inquiry for the parameter information to the management device and acquire the parameter information having contents that are based on the inquiry from the management device, upon being started up.

A tool system of the present disclosure includes a cutting tool including a cutting insert having a cutting edge, a holder holding the cutting insert, a sensor provided in the holder, and an information communication circuitry provided in the holder; and a management device provided outside the cutting tool. The management device is configured to transmit parameter information related to measurement by the sensor.

A communication method of the present disclosure is a communication method for a tool system including a cutting tool and a management device, the cutting tool including a holder holding a cutting insert having a cutting edge, and a sensor provided in the holder. The communication method includes a step of establishing, by the management device and the cutting tool, a communication connection with each other; and a step of transmitting, by the management device, parameter information related to measurement by the sensor to the cutting tool.

A cutting tool holder of the present disclosure is a cutting tool holder used for a cutting tool, and includes a holding portion holding a cutting insert; a sensor; and an information communication circuitry configured to transmit an inquiry for parameter information related to measurement by the sensor to a management device provided outside the cutting tool and acquire the parameter information from the management device.

An aspect of the present disclosure may be implemented as a semiconductor integrated circuit that implements part or whole of a cutting tool. An aspect of the present disclosure may be implemented as a semiconductor integrated circuit that implements part or whole of a tool system. An aspect of the present disclosure may be implemented as a program for causing a computer to execute steps of a process in a communication method. An aspect of the present disclosure may be implemented as a semiconductor integrated circuit that implements part or whole of a cutting tool holder.

DESCRIPTION OF EMBODIMENTS

Figure 1:
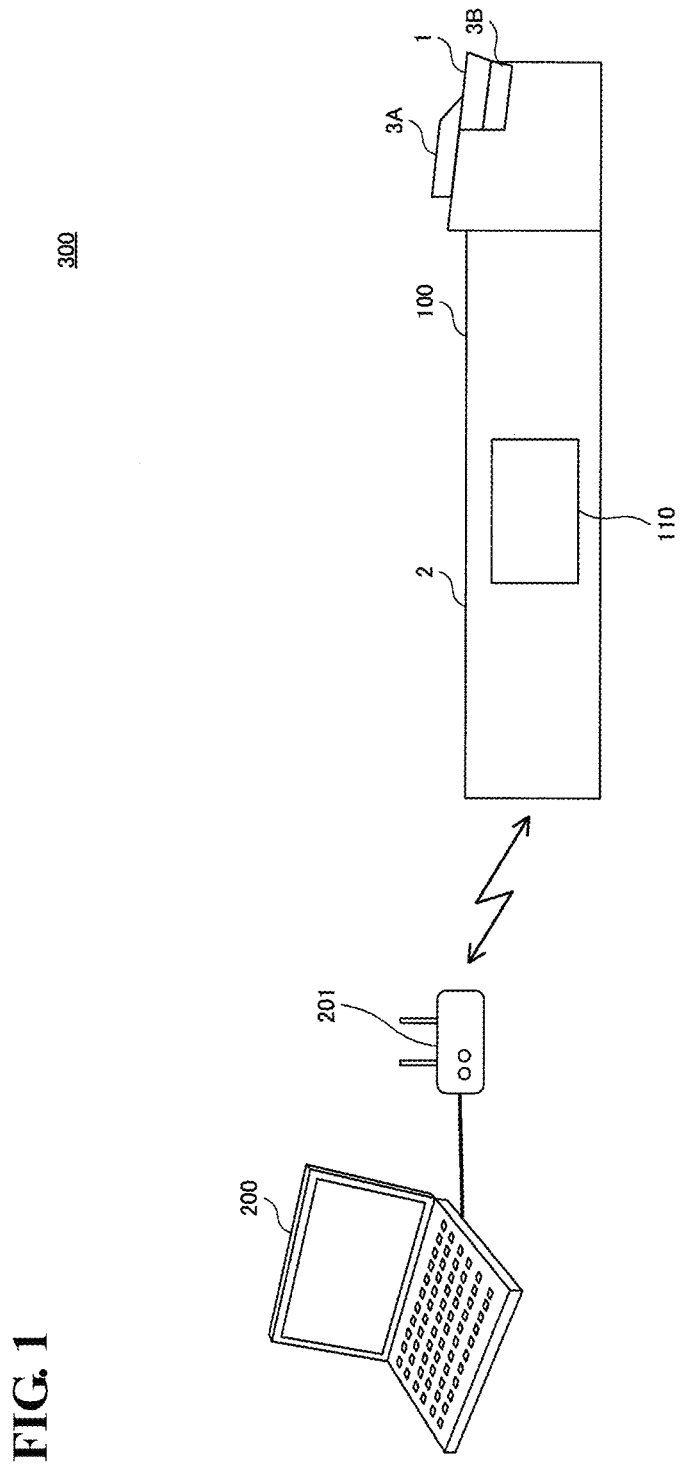
FIG. 1 is a diagram illustrating a configuration of a tool system according to an embodiment of the present disclosure.

Cutting tools excellent in tool life have been developed.

Problems to be Solved by Present Disclosure

Estimating of the life of a cutting tool makes it possible to replace a tool such as a cutting insert at an appropriate timing. A technique capable of implementing an excellent function for such estimation is desired.

The present disclosure has been made to solve the above-described issue, and an object thereof is to provide a cutting tool, a cutting tool holder, a tool system, and a communication method that are capable of implementing an excellent function related to estimation of the life of the cutting tool.

Advantageous Effects of Present Disclosure

According to the present disclosure, it is possible to implement an excellent function related to estimation of the life of a cutting tool.

Description of Embodiments of Present Disclosure

First, the contents of embodiments of the present disclosure will be described in order.

(1) A cutting tool according to an embodiment of the present disclosure includes a cutting insert having a cutting edge; a holder holding the cutting insert; a sensor provided in the holder; and an information communication unit that is provided in the holder, transmits an inquiry for parameter information related to measurement by the sensor to a management device provided outside the cutting tool, and acquires the parameter information from the management device.

With this configuration of transmitting an inquiry for parameter information related to measurement by the sensor to the management device provided outside the cutting tool and acquiring the parameter information from the management device, for example, measurement by the sensor can be performed in accordance with the parameter information that is set in accordance with details of machining using the cutting tool. Thus, an increase in current consumption of the sensor can be suppressed while highly accurate measurement is performed using the sensor. In addition, in a system of wirelessly transmitting a measurement result of the sensor, an increase in data amount of the measurement result can be suppressed, and thus, for example, interference of radio signals caused by an increase in radio traffic can be suppressed. Thus, an excellent function related to estimation of the life of the cutting tool can be implemented.

(2) Preferably, the information communication unit acquires the parameter information upon being started up.

With this configuration, for example, in the cutting tool that is to perform a different type of machining operation every time the cutting tool is started up, parameter information that is set in accordance with details of the machining operation can be acquired.

(3) Preferably, the information communication unit acquires a plurality of chronological pieces of parameter information each of which is the parameter information.

With this configuration, for example, a measurement parameter of the sensor can be chronologically changed, and measurement by the sensor can be appropriately performed when the cutting tool performs various types of machining operations.

(4) More preferably, the information communication unit acquires the plurality of chronological pieces of parameter information that are set in accordance with types of machining operations chronologically performed by the cutting tool.

With this configuration, when the type of machining operation using the cutting tool chronologically changes, parameter information that is set in accordance with each type of machining operation can be acquired, and measurement by the sensor can be appropriately performed.

(5) Preferably, the information communication unit acquires the parameter information including a measurement parameter, a measurement start timing, and a measurement period.

With this configuration, the measurement parameter, the measurement start timing, and the measurement period of the sensor can be controlled on the basis of the parameter information, and thus an increase in current consumption of the sensor, an increase in data amount of a measurement result, and the like can be suppressed more reliably.

(6) Preferably, the cutting tool further includes a control unit that is provided in the holder and controls an operation of the sensor, and a storage unit provided in the holder. In response to the parameter information acquired by the information communication unit does not include at least any one of a measurement parameter, a measurement start timing, and a measurement period related to the measurement by the sensor, the control unit controls the operation of the sensor by using information on a corresponding one of the measurement parameter, the measurement start timing, and the measurement period stored in the storage unit in advance.

With this configuration, even when the contents of the acquired parameter information are insufficient, the operation of the sensor can be controlled by using the information stored in the storage unit.

(7) A cutting tool according to an embodiment of the present disclosure includes a cutting insert having a cutting edge; a holder holding the cutting insert; a sensor provided in the holder and including at least either one of an acceleration sensor and a strain sensor; a wireless communication chip that is provided in the holder, transmits an inquiry for parameter information related to measurement by the sensor to a management device provided outside the cutting tool, and acquires the parameter information; a storage unit that is provided in the holder and stores the parameter information; and a processor provided in the holder. The wireless communication chip transmits the inquiry for the parameter information to the management device and acquires the parameter information having contents that are based on the inquiry from the management device, upon being started up.

With this configuration of transmitting an inquiry for parameter information related to measurement by the sensor including an acceleration sensor or a strain sensor to the management device provided outside the cutting tool and acquiring the parameter information from the management device, for example, measurement by the sensor can be performed in accordance with the parameter information that is set in accordance with details of machining using the cutting tool. Thus, an increase in current consumption of the sensor can be suppressed while highly accurate measurement is performed using the sensor. In addition, in a system of wirelessly transmitting a measurement result of the sensor, an increase in data amount of the measurement result can be suppressed, and thus, for example, interference of radio signals caused by an increase in radio traffic can be suppressed. Furthermore, in the cutting tool that is to perform a different type of machining operation every time the cutting tool is started up, parameter information that is set in accordance with details of the machining operation can be acquired by transmitting an inquiry for the parameter information to the management device every time the cutting tool is started up. Thus, an excellent function related to estimation of the life of the cutting tool can be implemented.

(8) A tool system according to an embodiment of the present disclosure includes a cutting tool including a cutting insert having a cutting edge, a holder holding the cutting insert, a sensor provided in the holder, and an information communication unit provided in the holder; and a management device provided outside the cutting tool. The management device transmits, to the information communication unit, parameter information related to measurement by the sensor.

With this configuration in which the management device provided outside the cutting tool transmits parameter information related to measurement by the sensor to the information communication unit in the cutting tool, for example, measurement by the sensor can be performed in accordance with the parameter information that is set in accordance with details of machining using the cutting tool. Thus, an increase in current consumption of the sensor can be suppressed while highly accurate measurement is performed using the sensor. In addition, in the system of wirelessly transmitting a measurement result of the sensor, an increase in data amount of the measurement result can be suppressed, and thus, for example, interference of radio signals caused by an increase in radio traffic can be suppressed. Thus, an excellent function related to estimation of the life of the cutting tool can be implemented.

(9) Preferably, the information communication unit transmits an inquiry for the parameter information to the management device upon being started up, and the management device transmits, to the information communication unit, the parameter information having contents that are based on the inquiry from the information communication unit.

With this configuration, for example, in the tool system including the cutting tool that is to perform a different type of machining operation every time the cutting tool is started up, a transmission unit transmits an inquiry for parameter information to the management device every time the transmission unit is started up, and thus parameter information that is set in accordance with details of a machining operation in the cutting tool can be transmitted from the management device to the cutting tool.

(10) Preferably, in response to the management device does not include the parameter information for the cutting tool, the management device controls displaying a configuration screen prompting setting of the parameter information.

With this configuration, even when the management device does not hold parameter information for the cutting tool, setting of parameter information by a user can be prompted, and the set parameter information can be transmitted to the cutting tool.

(11) Preferably, the tool system includes a plurality of cutting tools each of which is the cutting tool. The management device holds, for each of the plurality of cutting tools, the parameter information including a measurement parameter, a measurement start timing, and a measurement period.

With this configuration, various machining operations can be appropriately performed by using the plurality of cutting tools, and the measurement parameter, the measurement start timing, and the measurement period of the sensor in each cutting tool can be controlled on the basis of the parameter information. Thus, an increase in current consumption of the sensor in each cutting tool, an increase in data amount of a measurement result, and the like can be suppressed more reliably.

(12) Preferably, the cutting tool further includes a control unit that controls an operation of the sensor, and a storage unit. In response to the parameter information transmitted from the management device to the information communication unit does not include at least any one of a measurement parameter, a measurement start timing, and a measurement period related to the measurement by the sensor, the control unit controls the operation of the sensor by using information on a corresponding one of the measurement parameter, the measurement start timing, and the measurement period stored in the storage unit in advance.

With this configuration, even when the contents of the parameter information transmitted from the management device to a reception unit in the cutting tool are insufficient, the operation of the sensor can be controlled in the cutting tool by using the information stored in the storage unit.

(13) A communication method according to an embodiment of the present disclosure is a communication method for a tool system including a cutting tool and a management device, the cutting tool including a holder holding a cutting insert having a cutting edge, and a sensor provided in the holder. The communication method includes a step of establishing, by the management device and the cutting tool, a communication connection with each other; and a step of transmitting, by the management device, parameter information related to measurement by the sensor to the cutting tool.

With this method of transmitting parameter information related to measurement by the sensor from the management device to the cutting tool, for example, measurement by the sensor can be performed in accordance with the parameter information that is set in accordance with details of machining using the cutting tool. Thus, an increase in current consumption of the sensor can be suppressed while highly accurate measurement is performed using the sensor. In addition, in the system of wirelessly transmitting a measurement result of the sensor, an increase in data amount of the measurement result can be suppressed, and thus, for example, interference of radio signals caused by an increase in radio traffic can be suppressed. Thus, an excellent function related to estimation of the life of the cutting tool can be implemented.

(14) A cutting tool holder according to an embodiment of the present disclosure is a cutting tool holder used for a cutting tool, and includes a holding portion holding a cutting insert, a sensor, and an information communication unit that transmits an inquiry for parameter information related to measurement by the sensor to a management device provided outside the cutting tool and acquires the parameter information from the management device.

With this configuration of transmitting an inquiry for parameter information related to measurement by the sensor to the management device provided outside the cutting tool and acquiring the parameter information from the management device, for example, measurement by the sensor can be performed in accordance with the parameter information that is set in accordance with details of machining using the cutting tool. Thus, an increase in current consumption of the sensor can be suppressed while highly accurate measurement is performed using the sensor. In addition, in a system of wirelessly transmitting a measurement result of the sensor, an increase in data amount of the measurement result can be suppressed, and thus, for example, interference of radio signals caused by an increase in radio traffic can be suppressed. Thus, an excellent function related to estimation of the life of the cutting tool can be implemented.

(15) Preferably, the information communication unit acquires the parameter information upon being started up.

With this configuration, for example, in the cutting tool that is to perform a different type of machining operation every time the cutting tool is started up, parameter information that is set in accordance with details of the machining operation can be acquired.

(16) Preferably, the information communication unit acquires a plurality of chronological pieces of parameter information each of which is the parameter information.

With this configuration, for example, a measurement parameter of the sensor can be chronologically changed, and measurement by the sensor can be appropriately performed when the cutting tool performs various types of machining operations.

(17) More preferably, the information communication unit acquires the plurality of chronological pieces of parameter information that are set in accordance with types of machining operations chronologically performed by the cutting tool.

With this configuration, when the type of machining operation using the cutting tool chronologically changes, parameter information that is set in accordance with each type of machining operation can be acquired, and measurement by the sensor can be appropriately performed.

(18) Preferably, the information communication unit acquires the parameter information including a measurement parameter, a measurement start timing, and a measurement period.

With this configuration, the measurement parameter, the measurement start timing, and the measurement period of the sensor can be controlled on the basis of the parameter information, and thus an increase in current consumption of the sensor, an increase in data amount of a measurement result, and the like can be suppressed more reliably.

(19) Preferably, the cutting tool holder further includes a control unit that controls an operation of the sensor, and a storage unit. In response to the parameter information acquired by the information communication unit does not include at least any one of a measurement parameter, a measurement start timing, and a measurement period related to the measurement by the sensor, the control unit controls the operation of the sensor by using information on a corresponding one of the measurement parameter, the measurement start timing, and the measurement period stored in the storage unit in advance.

With this configuration, even when the contents of the acquired parameter information are insufficient, the operation of the sensor can be controlled by using the information stored in the storage unit.

Hereinafter, embodiments of the present disclosure will be described with reference to the drawings. In the drawings, the same or corresponding parts are denoted by the same reference numerals, and the description thereof will not be repeated. At least parts of the embodiments described below may be combined in any manner.

[Tool System]

FIG. 1 is a diagram illustrating a configuration of a tool system according to an embodiment of the present disclosure.

Referring to FIG. 1, a tool system 300 includes a cutting tool 100, a management device 200, and a wireless base unit 201. The cutting tool 100 includes a cutting insert 1 having a cutting edge, a cutting tool holder 2, and a sensor module 110. The sensor module 110 includes a sensor. Hereinafter, the cutting tool holder 2 will be simply referred to as a holder 2.

The wireless base unit 201 is connected to the management device 200, for example, in a wired manner. The wireless base unit 201 is, for example, an access point.

The cutting tool 100 is, for example, a tool for turning, and is to be attached to a turning machine. The holder 2 holds the cutting insert 1 having a cutting edge. The sensor module 110 is provided in the holder 2.

The holder 2 includes fixing members 3A and 3B. The fixing members 3A and 3B hold the cutting insert 1. The fixing members 3A and 3B are examples of a holding portion.

The cutting insert 1 is, for example, polygonal, such as triangular, square, rhombic, or pentagonal, as viewed from the top. For example, the cutting insert 1 has a through hole at the center of a top surface, and is fixed to the holder 2 by the fixing members 3A and 3B.

The tool system 300 is not limited to the configuration including a single cutting tool 100, and may have a configuration including a plurality of cutting tools 100. Also, the tool system 300 is not limited to the configuration including a single management device 200, and may have a configuration including a plurality of management devices 200.

The management device 200 transmits, to the cutting tool 100, parameter information related to measurement by the sensor of the sensor module 110 of the cutting tool 100. The management device 200 is provided outside the cutting tool 100.

More specifically, for example, the cutting tool 100 wirelessly transmits, to the wireless base unit 201, a parameter information request that includes a sensor ID, which is an ID of the sensor in the sensor module 110 of the cutting tool 100, and that is for inquiring for parameter information related to measurement by the sensor.

The wireless base unit 201 acquires the parameter information request from a radio signal received from the cutting tool 100 and transmits the parameter information request to the management device 200.

Upon receiving the parameter information request from the cutting tool 100 via the wireless base unit 201, the management device 200 transmits, as a response to the received parameter information request, parameter information addressed to the cutting tool 100 and having contents based on the parameter information request to the wireless base unit 201.

More specifically, the management device 200 transmits, as parameter information related to measurement by the sensor, information including a measurement operation, a measurement setting range, and so forth to the wireless base unit 201.

Here, the measurement operation includes, for example, a sampling period of the sensor, and a sampling period of an analog-to-digital (AD) converter that AD converts an analog signal indicating a physical amount measured by the sensor. The measurement setting range includes, for example, a measurement range of the sensor, and information indicating whether a frequency divider circuitry or a frequency multiplier circuitry is used in a preceding stage of the AD converter. Hereinafter, the frequency divider circuitry and frequency multiplier circuitry in the preceding stage of the AD converter will be referred to as a preceding-stage circuitry.

The wireless base unit 201 transmits a radio signal including the parameter information received from the management device 200 to the cutting tool 100.

The cutting tool 100 acquires the parameter information from the radio signal received from the wireless base unit 201, performs measurement by the sensor in the sensor module 110 in accordance with the acquired parameter information, and wirelessly transmits, to the wireless base unit 201, measurement information including a measurement result or measurement information including information based on a measurement result, and the sensor ID.

For example, the cutting tool 100 wirelessly transmits a sensor packet including measurement information to the wireless base unit 201 on a regular or irregular basis.

The cutting tool 100 and the wireless base unit 201 perform wireless communication using a communication protocol such as, for example, ZigBee conforming to IEEE 802.15. 4, Bluetooth (registered trademark) conforming to IEEE 802.15.1, or an ultra wide band (UWB) conforming to IEEE 802.15.3a. A communication protocol other than the foregoing protocols may be used between the cutting tool 100 and the wireless base unit 201.

The wireless base unit 201 relays the sensor packet received from the cutting tool 100 to the management device 200.

Figure 2:
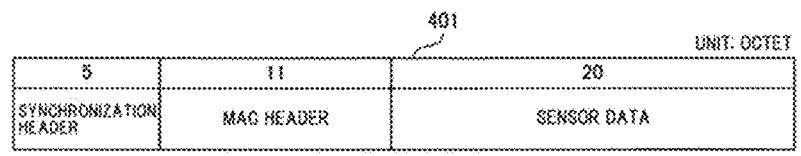
FIG. 2 is a diagram illustrating an example of a sensor packet transmitted by a cutting tool according to an embodiment of the present disclosure.

FIG. 2 is a diagram illustrating an example of a sensor packet transmitted by a cutting tool according to an embodiment of the present disclosure.

Referring to FIG. 2, the sensor module 110 in the cutting tool 100 creates a sensor packet 401 having a "sensor data" field storing measurement information and a sensor ID, which is the ID of the sensor.

Here, in a "synchronization header" field in the sensor packet 401, for example, a predetermined preamble is stored. In a "media access control (MAC) header" field, for example, a MAC address or the like of the sensor module 110 is stored. The "sensor data" field has a data length of 20 octets in FIG. 2. However, the data length can be changed in accordance with the type of physical amount included in measurement information, the number of physical amounts, and so forth.

The wireless base unit 201 acquires the sensor packet included in a radio signal received from the cutting tool 100 and transmits the sensor packet to the management device 200.

Figure 3:
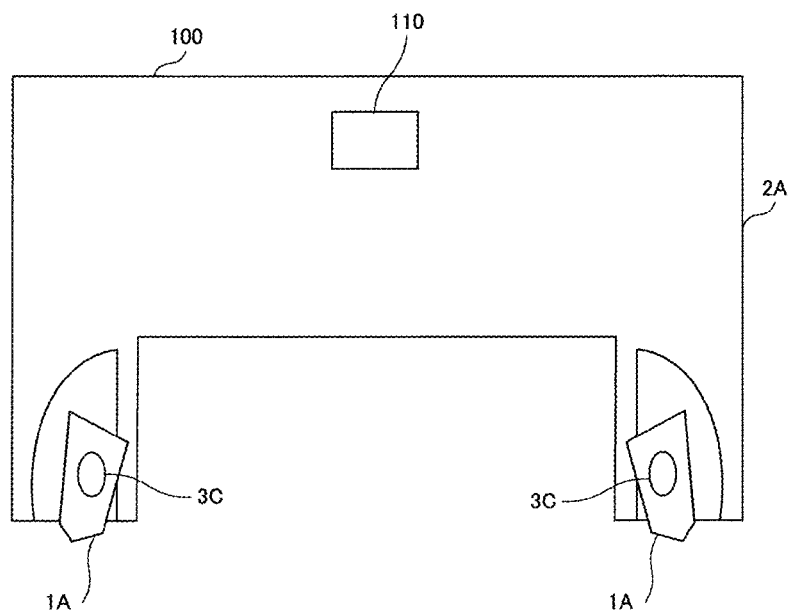
FIG. 3 is a sectional view illustrating another example of the configuration of the cutting tool according to an embodiment of the present disclosure.

FIG. 3 is a sectional view illustrating another example of the configuration of the cutting tool according to an embodiment of the present disclosure.

Referring to FIG. 3, the cutting tool 100 may be a tool for milling that is to be attached to a milling machine. More specifically, the cutting tool 100 for milling includes a holder 2A holding a plurality of cutting inserts 1A each having a cutting edge, and the sensor module 110 provided in the holder 2A and including a sensor. The holder 2A includes fixing members 3C. The fixing members 3C hold the cutting inserts 1A. The cutting inserts 1A are fixed to the holder 2A by the fixing members 3C, for example. The fixing members 3C correspond to an example of the holding portion.

[Management Device]

Figure 4:
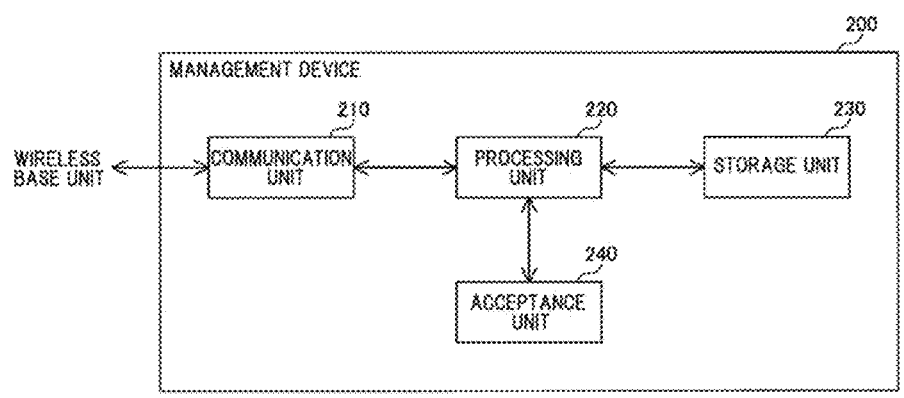
FIG. 4 is a diagram illustrating a configuration of a management device according to an embodiment of the present disclosure.

FIG. 4 is a diagram illustrating a configuration of a management device according to an embodiment of the present disclosure.

Referring to FIG. 4, the management device 200 includes a communication unit 210, a processing unit 220, a storage unit 230, and an acceptance unit 240. The storage unit 230 is, for example, a flash memory.

The communication unit 210 receives a sensor packet from the cutting tool 100 via the wireless base unit 201, acquires measurement information and a sensor ID from the received sensor packet, and outputs the acquired measurement information and sensor ID to the processing unit 220.

Upon receiving the measurement information and the sensor ID from the communication unit 210, the processing unit 220 stores the measurement information in the storage unit 230 in association with the sensor ID.

On the basis of the measurement information in the storage unit 230, the processing unit 220 estimates the life of the cutting insert 1 in the cutting tool 100 associated with the relevant sensor ID. On the basis of a result of the estimation, the processing unit 220 makes a notification prompting a user to replace the cutting insert 1.

For example, the storage unit 230 stores parameter information for each of cutting tools 100.

More specifically, the acceptance unit 240 accepts, from the user, setting of parameter information related to measurement by the sensor in the sensor module 110 of the cutting tool 100. For example, the acceptance unit 240 accepts, from the user, setting of parameter information associated with the sensor ID of the sensor in each cutting tool 100 and including a measurement parameter, which includes the above-described sampling frequency and measurement range, a measurement start timing, and a measurement period.

The acceptance unit 240 outputs the parameter information accepted through an operation or the like of the user to the processing unit 220.

Upon receiving the parameter information from the acceptance unit 240, the processing unit 220 stores the received parameter information in the storage unit 230 in units of cutting tools 100. Specifically, the processing unit 220 stores the parameter information in the storage unit 230 in association with the sensor ID of the sensor.

Upon receiving a parameter information request from the cutting tool 100 via the wireless base unit 201, the communication unit 210 outputs the received parameter information request to the processing unit 220.

Upon receiving the parameter information request from the communication unit 210, the processing unit 220 acquires parameter information associated with the sensor ID included in the parameter information request from the storage unit 230. The processing unit 220 transmits, as a response to the parameter information request received from the cutting tool 100, the parameter information acquired from the storage unit 230 to the cutting tool 100.

For example, the processing unit 220 transmits a plurality of chronological pieces of parameter information to the relevant cutting tool 100.

Specifically, the processing unit 220 transmits a plurality of chronological pieces of parameter information that are set in accordance with the types of machining operations performed by a single cutting tool 100 attached to a machining device, to the relevant cutting tool 100. Here, the types of machining operations mean a machining schedule including rough machining, semi-finish machining, finish machining, and the like, or the types of workpiece to be cut.

Alternatively, the processing unit 220 transmits a plurality of chronological pieces of parameter information that are set in accordance with the types of machining operations chronologically performed by a plurality of cutting tools 100 attached to a single machining device, to the individual relevant cutting tools 100.

If the storage unit 230 does not hold parameter information associated with the cutting tool 100, the processing unit 220 transmits, as a response to the parameter information request received from the cutting tool 100, setting-undone information indicating that parameter information has not been set to the cutting tool 100.

Alternatively, if the storage unit 230 does not hold parameter information associated with the cutting tool 100, the processing unit 220 controls displaying a configuration screen prompting setting of parameter information on the management device 200 or a display device that is not illustrated.

Figure 5:
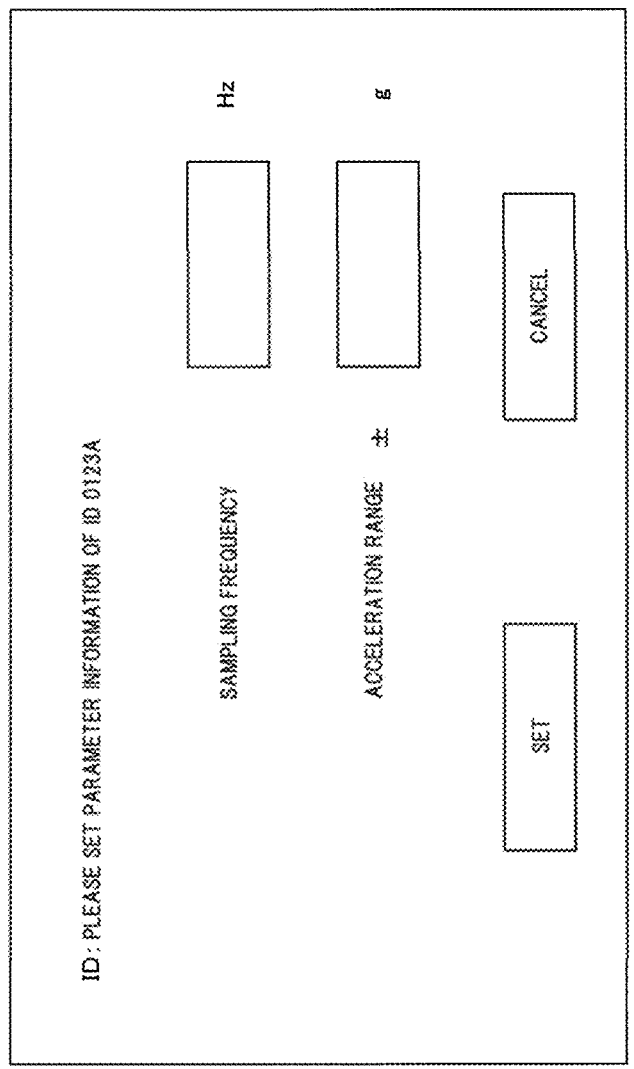
FIG. 5 is a diagram illustrating an example of a configuration screen displayed on the management device according to an embodiment of the present disclosure.

FIG. 5 is a diagram illustrating an example of a configuration screen displayed on the management device according to an embodiment of the present disclosure. FIG. 5 illustrates a screen prompting setting of parameter information of an acceleration sensor, which is an example of the sensor.

Referring to FIG. 5, for example, the processing unit 220 displays a configuration screen prompting setting of a sampling frequency and an acceleration range of the acceleration sensor having a sensor ID "0123A".

Upon accepting input of parameter information to the configuration screen from the user, the processing unit 220 transmits, as a response to the parameter information request received from the cutting tool 100, the input parameter information to the cutting tool 100.

[Sensor Module]

Figure 6:
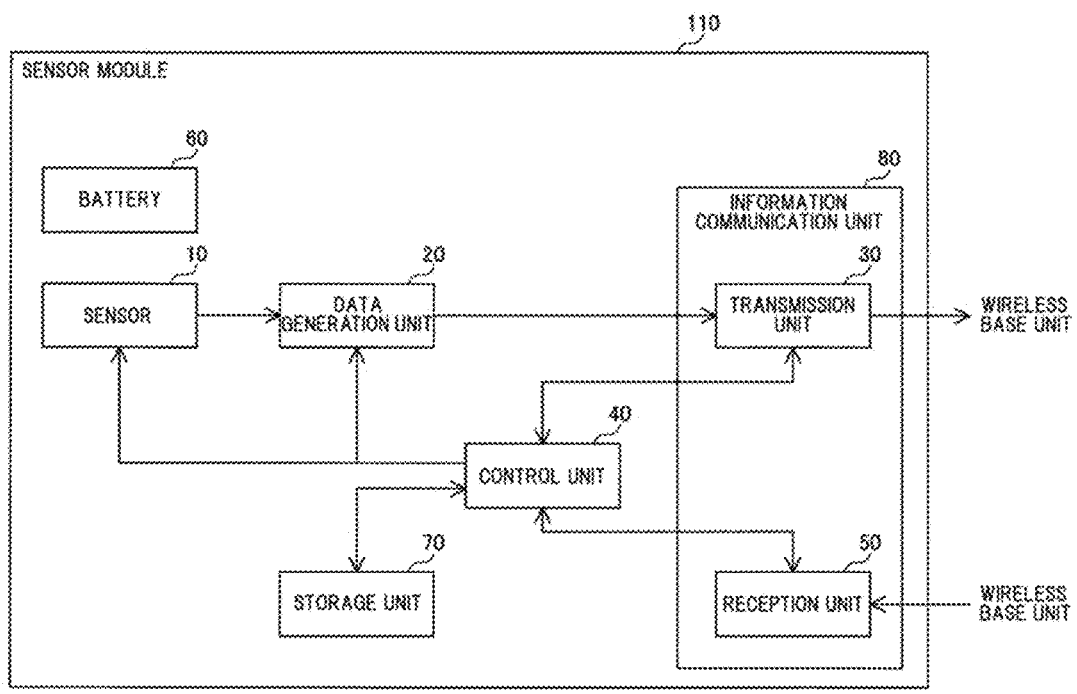
FIG. 6 is a diagram illustrating a configuration of a sensor module according to an embodiment of the present disclosure.

FIG. 6 is a diagram illustrating a configuration of a sensor module according to an embodiment of the present disclosure.

Referring to FIG. 6, the sensor module 110 includes a sensor 10, a data generation unit 20, a control unit 40, a battery 60, a storage unit 70, and an information communication unit 80. The storage unit 70 is, for example, a flash memory. The information communication unit 80 includes a transmission unit 30 and a reception unit 50. The information communication unit 80 is implemented by, for example, a wireless communication chip.

The battery 60 is, for example, a primary battery, a secondary battery, a solar battery, or a power storage device including a capacitor or the like. The battery 60 stores energy, and supplies power to individual circuitries in the sensor module 110, such as the control unit 40 and the information communication unit 80, by using the stored energy.

More specifically, for example, upon the sensor module 110 being switched on, the power of the battery 60 is supplied to the individual circuitries in the sensor module 110, and the individual circuitries in the sensor module 110 start up.

The sensor 10 is, for example, an acceleration sensor, a strain sensor, a pressure sensor, a sound sensor, or a temperature sensor.

The sensor 10 measures at least any one of physical amounts such as an acceleration, a strain, a pressure, a sound, and a temperature, and outputs an analog signal indicating the measured physical amount to the data generation unit 20. The sensor 10 is driven by, for example, power supplied from the battery 60.

The data generation unit 20 creates measurement information including a measurement result of the sensor 10 or information based on the measurement result. More specifically, the data generation unit 20 receives an analog signal from the sensor 10, and creates measurement information including a sensor measurement value obtained by AD converting the received analog signal, or measurement information including a value obtained by performing computation such as averaging on the sensor measurement value.

The control unit 40 performs connection processing of establishing a communication connection with the management device 200. The control unit 40 is, for example, a processor such as a central processing unit (CPU).

For example, in the tool system 300, the management device 200 transmits an advertising packet to the cutting tool 100 via the wireless base unit 201.

Figure 7:
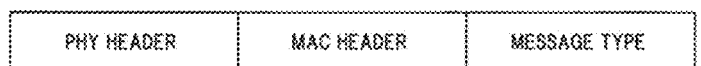
FIG. 7 is a diagram illustrating an example of a format of an advertising packet transmitted by the management device in the tool system according to an embodiment of the present disclosure.

FIG. 7 is a diagram illustrating an example of a format of an advertising packet transmitted by the management device in the tool system according to an embodiment of the present disclosure.

Referring to FIG. 7, the advertising packet is constituted by a PHY header, a MAC header, and a field corresponding to a message type, arranged in this order from the top.

The management device 200 generates an advertising packet in which a broadcast address is set as a destination in the MAC header, an ID such as a MAC address of the management device 200 is set as a source in the MAC header, and an identifier identifying the packet as an advertising packet is set to the field corresponding to a message type, and transmits the generated advertising packet to the wireless base unit 201.

The wireless base unit 201 transmits a radio signal including the advertising packet received from the management device 200.

The reception unit 50 in the information communication unit 80 receives the radio signal from the wireless base unit 201 and acquires the advertising packet included in the received radio signal. The reception unit 50 outputs the acquired advertising packet to the control unit 40.

Upon receiving the advertising packet from the reception unit 50, the control unit 40 performs connection processing, that is, sets the management device 200 having the MAC address of the source included in the received advertising packet as a communication target. Specifically, the control unit 40 registers the MAC address in the storage unit 70 as the MAC address of the management device 200 as a communication target.

In addition, in the connection processing, the control unit 40 generates a response packet, which is a response to the received advertising packet, and outputs the generated response packet to the transmission unit 30 in the information communication unit 80. The format of the response packet generated by the control unit 40 is, for example, the same as the format of the advertising packet illustrated in FIG. 7.

For example, the control unit 40 generates a response packet in which the MAC address of the management device 200 is set as a destination in the MAC header, the MAC address of the sensor module 110 of the cutting tool 100, for example, is set as a source in the MAC header, and an identifier identifying the packet as a response packet is set to the field corresponding to a message type, and outputs the generated response packet to the transmission unit 30.

The transmission unit 30 transmits a radio signal including the response packet received from the control unit 40.

Upon receiving the response packet from the sensor module 110 of the cutting tool 100 via the wireless base unit 201, the management device 200 sets the sensor module 110 corresponding to the MAC address of the source included in the received response packet as a communication target.

Specifically, upon receiving the response packet from the sensor module 110 via the wireless base unit 201 and the communication unit 210, the processing unit 220 in the management device 200 registers the MAC address of the source included in the received response packet in the storage unit 230 as the MAC address of the sensor module 110 as a communication target.

Upon establishing the communication connection with the management device 200, the control unit 40 generates a parameter information request including the sensor ID of the sensor and addressed to the management device 200, and outputs the generated parameter information request to the transmission unit 30.

For example, every time the control unit 40 is started up, the control unit 40 establishes a communication connection with the management device 200, generates a parameter information request addressed to the management device 200, and outputs the generated parameter information request to the transmission unit 30.

The transmission unit 30 transmits an inquiry for parameter information related to measurement by the sensor 10 to the management device 200. More specifically, the transmission unit 30 transmits a parameter information request to the management device 200 via the wireless base unit 201.

For example, the transmission unit 30 wirelessly transmits, upon startup, a parameter information request received from the control unit 40 to the wireless base unit 201. More specifically, the transmission unit 30 wirelessly transmits, upon startup of the transmission unit 30, a parameter information request received from the control unit 40 to the wireless base unit 201. Alternatively, the transmission unit 30 wirelessly transmits, upon startup of the individual circuitries in the sensor module 110, a parameter information request received from the control unit 40 to the wireless base unit 201.

The reception unit 50 acquires parameter information related to measurement by the sensor 10 from the management device 200 outside the cutting tool 100. For example, the reception unit 50 receives parameter information including a measurement parameter, a measurement start timing, and a measurement period.

More specifically, the reception unit 50 receives parameter information from the management device 200 via the wireless base unit 201.

For example, the reception unit 50 receives, upon startup, parameter information from the management device 200. More specifically, the reception unit 50 receives, upon startup of the reception unit 50, parameter information from the management device 200. Alternatively, the reception unit 50 receives, upon startup of the individual circuitries in the sensor module 110, parameter information from the management device 200.

For example, the reception unit 50 receives parameter information that varies according to the type of machining operation.

Upon receiving the parameter information from the management device 200, the reception unit 50 outputs the received parameter information to the control unit 40.

The control unit 40 waits until receiving parameter information from the reception unit 50 after outputting a parameter information request to the transmission unit 30. Upon receiving parameter information from the reception unit 50, the control unit 40 stores the received parameter information in the storage unit 70. In addition, the control unit 40 controls an operation of at least either one of the sensor 10 and the data generation unit 20 in accordance with the received parameter information.

For example, the control unit 40 controls, in accordance with the received parameter information, at least either one of: a sampling period and measurement range of the sensor 10; and a sampling period of AD conversion in the data generation unit 20 and whether a preceding-stage circuit is used.

Specifically, the control unit 40 generates, in accordance with the received parameter information, setting information A indicating a sampling period and a measurement range of the sensor 10, and outputs the generated setting information A to the sensor 10.

Also, the control unit 40 generates, in accordance with the received parameter information, setting information B indicating a sampling period of the AD converter in the data generation unit 20 and whether a preceding-stage circuit is used, and outputs the generated setting information B to the data generation unit 20.

Upon receiving the setting information A from the control unit 40, the sensor 10 performs measurement in accordance with the received setting information A, and outputs an analog signal indicating a measured physical amount to the data generation unit 20.

Upon receiving the setting information B from the control unit 40, the data generation unit 20 generates measurement information in accordance with the received setting information B. The data generation unit 20 also generates a sensor packet storing the generated measurement information and the sensor ID of the sensor 10, and outputs the generated sensor packet to the transmission unit 30 on a regular or irregular basis.

The transmission unit 30 wirelessly transmits measurement information to the management device 200 outside the cutting tool 100 on a regular or irregular basis. More specifically, the transmission unit 30 wirelessly transmits the sensor packet received from the data generation unit 20 and storing the measurement information and the sensor ID to the wireless base unit 201. The transmission unit 30 is driven by, for example, power supplied from the battery 60.

For example, the reception unit 50 receives a plurality of chronological pieces of parameter information from the management device 200. More specifically, the reception unit 50 receives, from the management device 200, a plurality of chronological pieces of parameter information that are set in accordance with the types of machining operations chronologically performed by the cutting tool 100.

For example, the reception unit 50 receives, from the management device 200, a plurality of chronological pieces of parameter information that are set in accordance with the types of machining operations chronologically performed by a single cutting tool 100.

In the case of performing measurement by using an acceleration sensor, which is an example of the sensor 10, a wider measurement range is set at the time of rough machining whereas a narrower measurement range is set at the time of finish machining, for example.

Specifically, the reception unit 50 receives, from the management device 200, parameter information related to measurement by an acceleration sensor, which is an example of the sensor 10. The parameter information indicates that the measurement range is −32 G to 32 G for a period of one minute during which rough machining is performed, that the measurement range is −16 G to 16 G for a period of three minutes during which semi-finish machining after rough machining is performed, and that the measurement range is −8 G to 8 G for a period of five minutes during which finish machining after semi-finish machining is performed.

Alternatively, for example, each of reception units 50 in a plurality of cutting tools 100 attached to a single machining device receives, from the management device 200, parameter information that is set in accordance with the type of a machining operation performed by using a corresponding one of the plurality of cutting tools 100 among the types of machining operations chronologically performed by using the plurality of cutting tools 100.

More specifically, for example, a case is assumed in which cutting tools 100A, 100B, and 100C are attached to a single machining device, and rough machining using the cutting tool 100A, semi-finish machining using the cutting tool 100B, and finish machining using the cutting tool 100C are chronologically performed.

The reception unit 50 in the cutting tool 100A receives, from the management device 200, parameter information related to measurement by an acceleration sensor, which is an example of the sensor 10. The parameter information indicates that the measurement range of the sensor 10 in the cutting tool 100A is set to −32 G to 32 G for a period of one minute during which rough machining is performed.

The reception unit 50 in the cutting tool 100B receives, from the management device 200, parameter information related to measurement by an acceleration sensor. The parameter information indicates that the measurement range of the sensor 10 in the cutting tool 100B is set to −16 G to 16 G for a period of three minutes during which semi-finish machining is performed.

The reception unit 50 in the cutting tool 100C receives, from the management device 200, parameter information related to measurement by an acceleration sensor. The parameter information indicates that the measurement range of the sensor 10 in the cutting tool 100C is set to −8 G to 8 G for a period of five minutes during which finish machining is performed.

On the other hand, upon receiving from the management device 200 setting-undone information indicating that parameter information has not been set in the management device 200, the reception unit 50 outputs the received setting-undone information to the control unit 40.

For example, initial parameter information, which is initially set parameter information, is stored in the storage unit 70.

If the control unit 40 does not receive parameter information from the reception unit 50 within a predetermined time after outputting a parameter information request to the transmission unit 30, or if the control unit 40 receives setting-undone information from the reception unit 50, the control unit 40 controls an operation of at least either one of the sensor 10 and the data generation unit 20 in accordance with the initial parameter information in the storage unit 70 or the latest parameter information stored in the storage unit 70.

Alternatively, for example, if the parameter information received from the reception unit 50 does not include at least any one of a measurement parameter, a measurement start timing, and a measurement period related to measurement by the sensor 10, the control unit 40 controls an operation of at least either one of the sensor 10 and the data generation unit 20 by using information on a corresponding one of the measurement parameter, the measurement start timing, and the measurement period stored in the storage unit 70.

[Operation Flow]

The individual devices in the tool system according to the embodiment of the present disclosure each include a computer including a memory. An arithmetic processing unit, such as a CPU, in the computer reads out a program including some or all of steps in the following flowchart or sequence from the memory, and executes the program. The programs for the plurality of devices can be installed from the outside. The programs for the plurality of devices are each circulated in the state of being stored in a recording medium.

Figure 8:
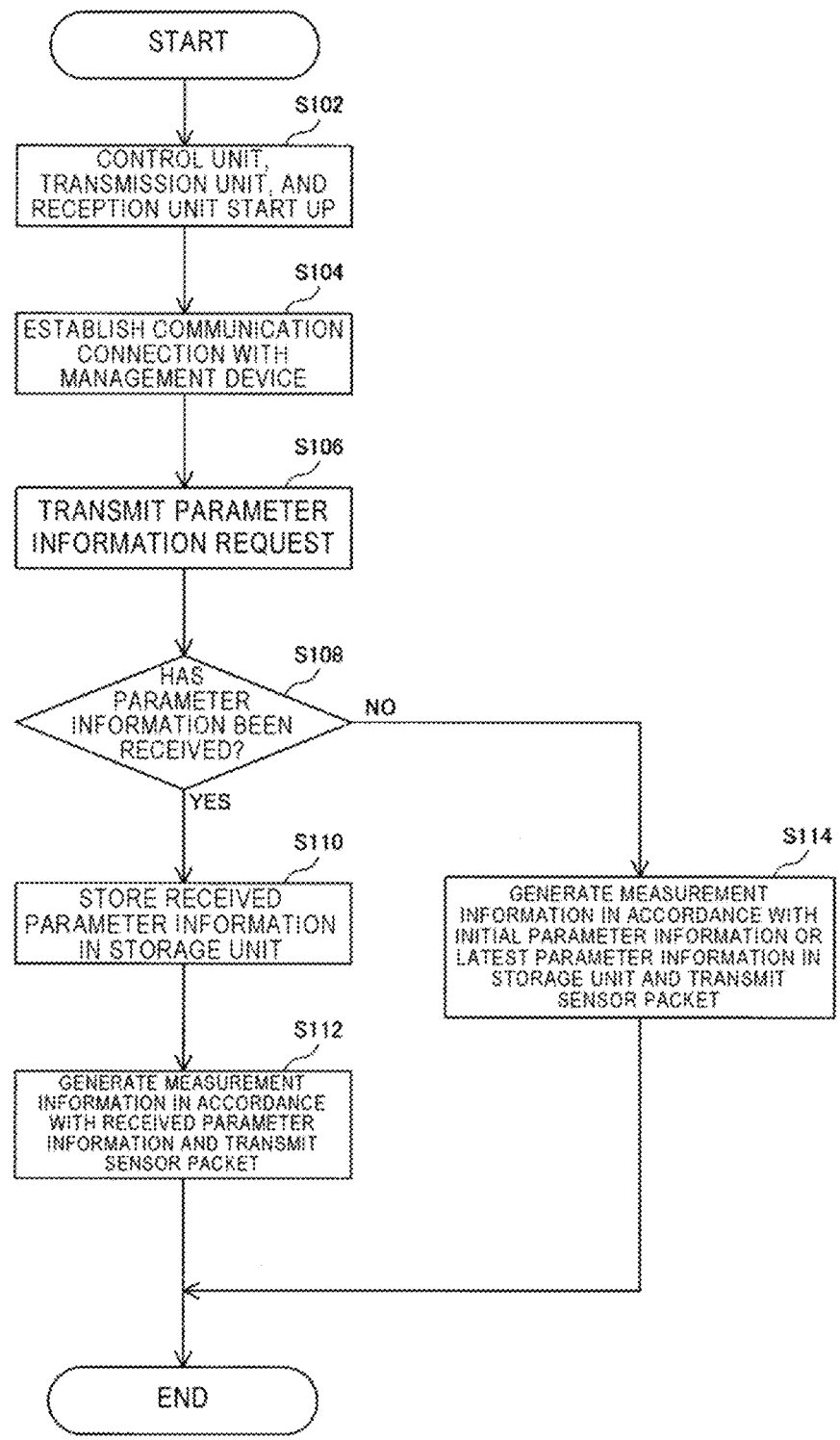
FIG. 8 is a flowchart defining an example of an operation procedure in which the cutting tool in the tool system transmits a sensor packet to the management device according to an embodiment of the present disclosure.

FIG. 8 is a flowchart defining an example of an operation procedure in which the cutting tool in the tool system transmits a sensor packet to the management device according to an embodiment of the present disclosure.

Referring to FIG. 8, first, the sensor module 110 in the cutting tool 100 is started up, and the individual circuitries in the sensor module 110, such as the control unit 40, the transmission unit 30, and the reception unit 50, start up (step S102).

Subsequently, the cutting tool 100 establishes a communication connection with the management device 200 (step S104).

Subsequently, the cutting tool 100 transmits a parameter information request to the management device 200 (step S106).

Subsequently, if the cutting tool 100 receives parameter information from the management device 200 within a predetermined time from the transmission of the parameter information request to the management device 200 (YES in step S108), the cutting tool 100 stores the received parameter information in the storage unit 70 (step S110).

Subsequently, the cutting tool 100 controls an operation of at least either one of the sensor 10 and the data generation unit 20 in accordance with the received parameter information to generate measurement information, and transmits a sensor packet including the generated measurement information to the management device 200, on a regular or irregular basis (step S112).

On the other hand, if the cutting tool 100 does not receive parameter information from the management device 200 within the predetermined time from the transmission of the parameter information request to the management device 200, or receives setting-undone information from the management device 200 (NO in step S108), the cutting tool 100 controls an operation of at least either one of the sensor 10 and the data generation unit 20 in accordance with the initial parameter information or the latest parameter information in the storage unit 70 to generate measurement information, and transmits a sensor packet including the generated measurement information to the management device 200, on a regular or irregular basis (step S114).

Figure 9:
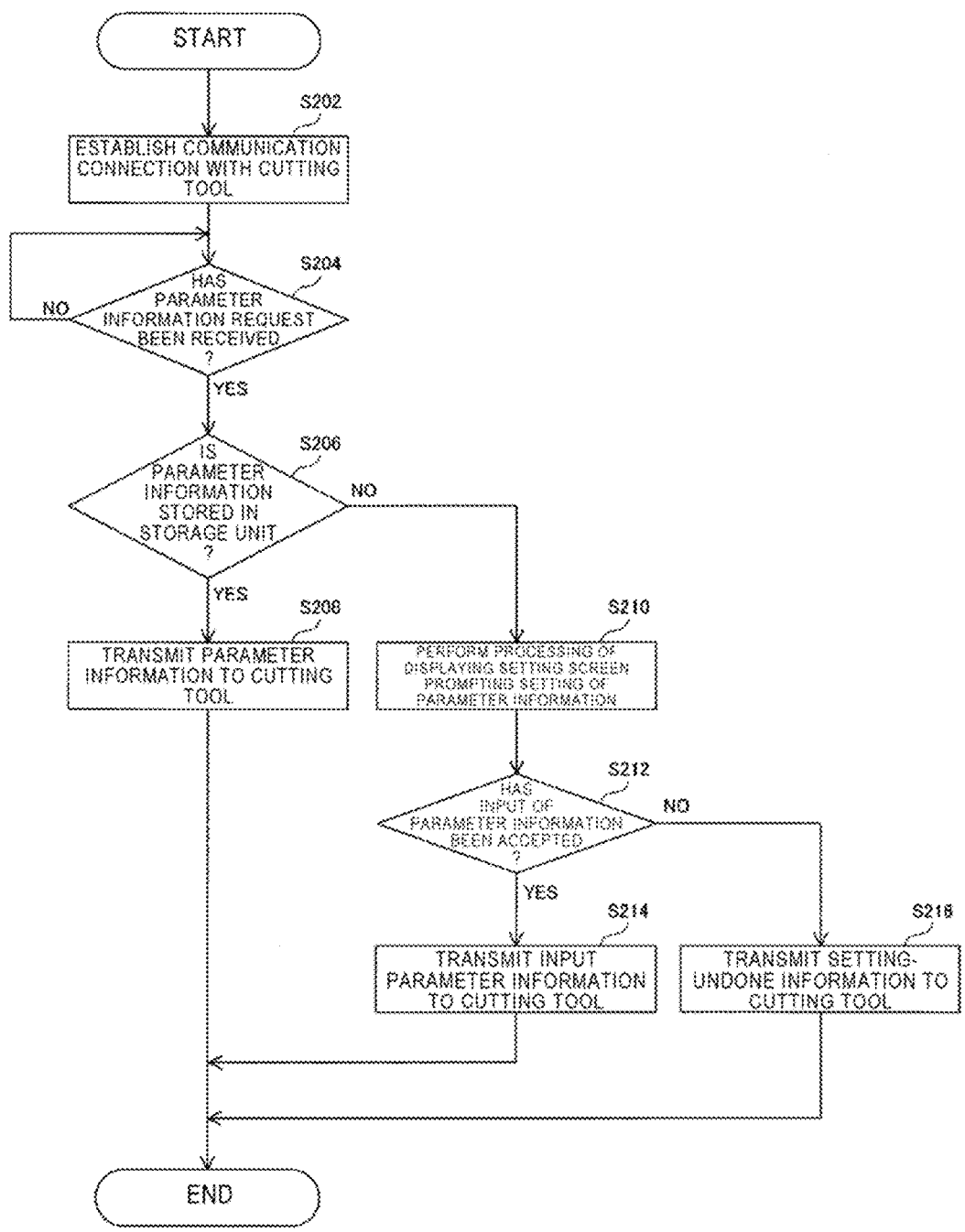
FIG. 9 is a flowchart defining an example of an operation procedure in which the management device in the tool system transmits parameter information to the cutting tool according to an embodiment of the present disclosure.

FIG. 9 is a flowchart defining an example of an operation procedure in which the management device in the tool system transmits parameter information to the cutting tool according to an embodiment of the present disclosure.

Referring to FIG. 9, first, the management device 200 establishes a communication connection with the cutting tool 100 (step S202).

Subsequently, the management device 200 waits for a parameter information request from the cutting tool 100 (NO in step S204). If the management device 200 receives a parameter information request from the cutting tool 100

(YES in step S204), the management device 200 determines whether parameter information is stored in the storage unit 230 (step S206).

Subsequently, if the parameter information associated with the sensor ID included in the received parameter information is stored in the storage unit 230 (YES in step S206), the management device 200 transmits, as a response to the received parameter information request, the parameter information to the cutting tool 100 (step S208).

On the other hand, if the parameter information associated with the sensor ID included in the received parameter information is not stored in the storage unit 230 (NO in step S206), the management device 200 controls displaying a configuration screen prompting setting of parameter information (step S210).

Subsequently, if the management device 200 accepts input of parameter information to the configuration screen from a user within a predetermined period (YES in step S212), the management device 200 transmits, as a response to the parameter information request received from the cutting tool 100, the input parameter information to the cutting tool 100 (step S214).

On the other hand, if the management device 200 does not accept input of parameter information to the configuration screen from the user within the predetermined period (NO in step S212), the management device 200 transmits setting-undone information indicating that parameter information has not been set to the cutting tool 100 (step S216).

Figure 10:
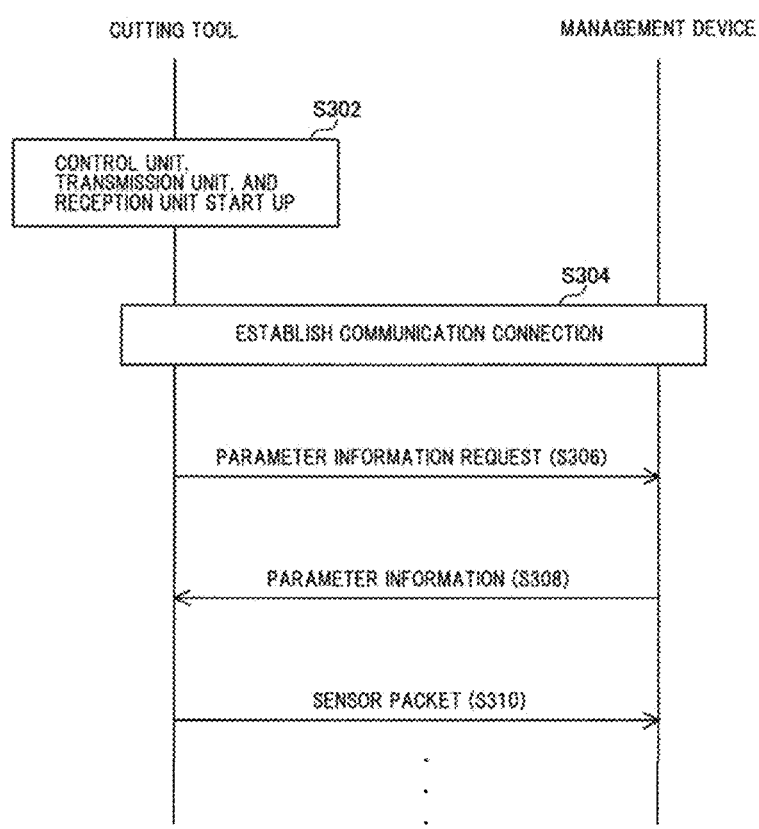
FIG. 10 is a diagram illustrating an example of a communication processing sequence in the tool system according to an embodiment of the present disclosure.

FIG. 10 is a diagram illustrating an example of a communication processing sequence in the tool system according to an embodiment of the present disclosure.

Referring to FIG. 10, first, the sensor module 110 in the cutting tool 100 is started up, and the individual circuitries in the sensor module 110, such as the control unit 40, the transmission unit 30, and the reception unit 50, start up (step S302).

Subsequently, the management device 200 and the cutting tool 100 establish a communication connection with each other (step S304).

Subsequently, the cutting tool 100 transmits a parameter information request to the management device 200 (step S306).

Subsequently, the management device 200 transmits, as a response to the received parameter information request, parameter information to the cutting tool 100 (step S308).

Subsequently, the cutting tool 100 generates measurement information in accordance with the received parameter information and transmits a sensor packet including the generated measurement information to the management device 200 on a regular or irregular basis (step S310).

Figure 11:
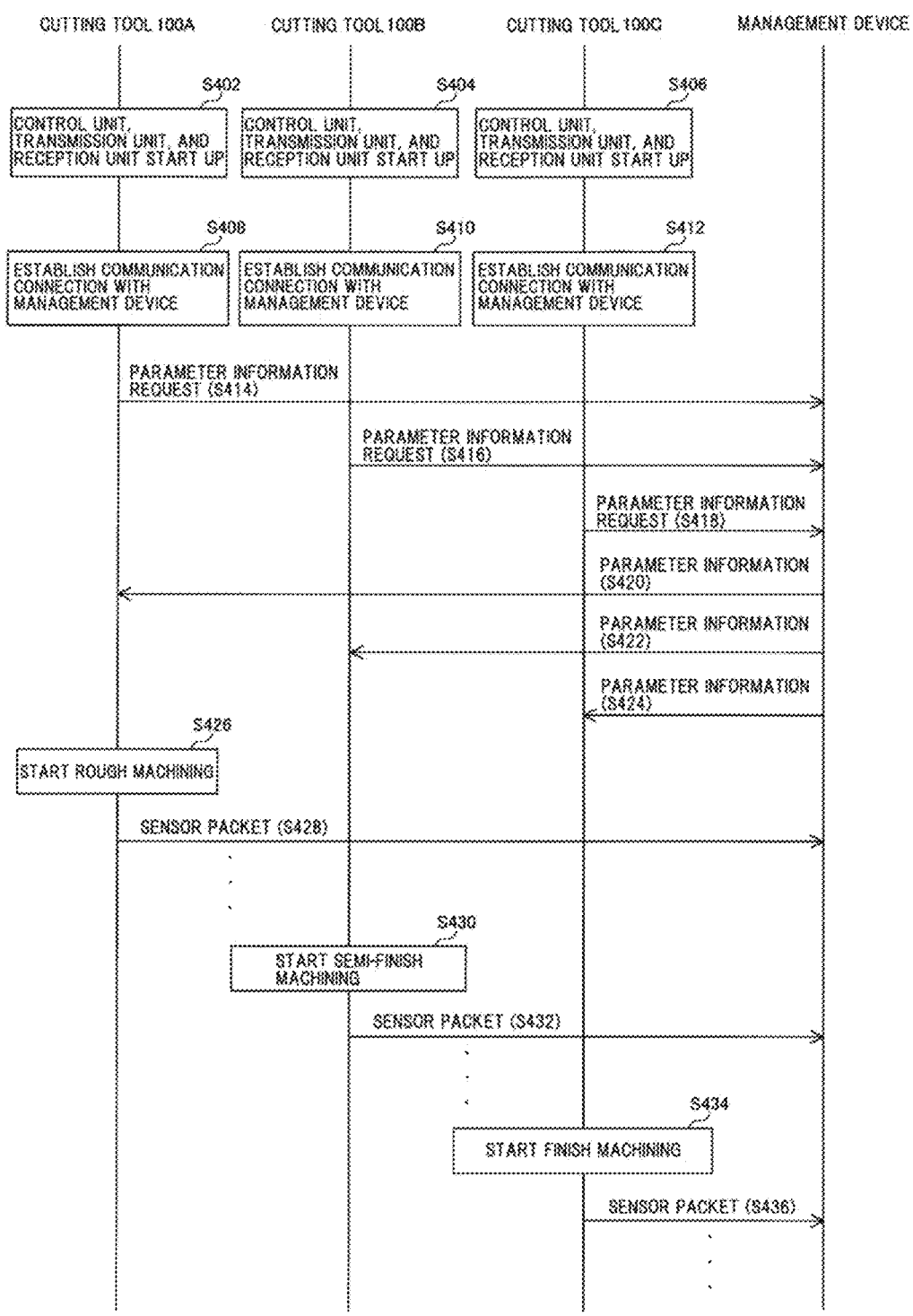
FIG. 11 is a diagram illustrating another example of a communication processing sequence in the tool system according to an embodiment of the present disclosure.

FIG. 11 is a diagram illustrating another example of a communication processing sequence in the tool system according to an embodiment of the present disclosure.

Referring to FIG. 11, first, the sensor module 110 in the cutting tool 100A, which is an example of the cutting tool 100, is started up, and the individual circuitries in the sensor module 110, such as the control unit 40, the transmission unit 30, and the reception unit 50, start up (step S402).

Also, the sensor module 110 in the cutting tool 100B, which is an example of the cutting tool 100, is started up, and the individual circuitries in the sensor module 110, such as the control unit 40, the transmission unit 30, and the reception unit 50, start up (step S404).

Also, the sensor module 110 in the cutting tool 100C, which is an example of the cutting tool 100, is started up, and the individual circuitries in the sensor module 110, such as the control unit 40, the transmission unit 30, and the reception unit 50, start up (step S406).

Subsequently, the cutting tool 100A establishes a communication connection with the management device 200 (step S408).

Also, the cutting tool 100B establishes a communication connection with the management device 200 (step S410).

Also, the cutting tool 100C establishes a communication connection with the management device 200 (step S412).

Subsequently, the cutting tool 100A transmits a parameter information request to the management device 200 (step S414).

Also, the cutting tool 100B transmits a parameter information request to the management device 200 (step S416).

Also, the cutting tool 100C transmits a parameter information request to the management device 200 (step S418).

Subsequently, the management device 200 transmits, as a response to the parameter information request received from the cutting tool 100A, parameter information that is set in accordance with rough machining performed by using the cutting tool 100A among the types of machining operations chronologically performed by using the cutting tools 100A, 100B, and 100C, to the cutting tool 100A (step S420).

Also, the management device 200 transmits, as a response to the parameter information request received from the cutting tool 100B, parameter information that is set in accordance with semi-finish machining performed by using the cutting tool 100B among the types of machining operations chronologically performed by using the cutting tools 100A, 100B, and 100C, to the cutting tool 100B (step S422).

Also, the management device 200 transmits, as a response to the parameter information request received from the cutting tool 100C, parameter information that is set in accordance with finish machining performed by using the cutting tool 100C among the types of machining operations chronologically performed by using the cutting tools 100A, 100B, and 100C, to the cutting tool 100C (step S424).

Subsequently, the cutting tool 100A starts rough machining (step S426).

Subsequently, the cutting tool 100A generates measurement information in accordance with the received parameter information and transmits a sensor packet including the generated measurement information to the management device 200 on a regular or irregular basis (step S428).

Subsequently, the cutting tool 100B starts semi-finish machining (step S430).

Subsequently, the cutting tool 100B generates measurement information in accordance with the received parameter information and transmits a sensor packet including the generated measurement information to the management device 200 on a regular or irregular basis (step S432).

Subsequently, the cutting tool 100C starts finish machining (step S434).

Subsequently, the cutting tool 100C generates measurement information in accordance with the received parameter information and transmits a sensor packet including the generated measurement information to the management device 200 on a regular or irregular basis (step S436).

In the tool system 300 according to the embodiment of the present disclosure, the management device 200 has a configuration of transmitting an advertising packet to the cutting tool 100 via the wireless base unit 201, and the cutting tool 100 has a configuration of transmitting a response packet to the management device 200 via the wireless base unit 201, but the configurations are not limited thereto. The cutting tool 100 may have a configuration of transmitting an advertising packet to the management device 200 via the wireless base unit 201, and the management device 200 may have a configuration of transmitting a response packet to the cutting tool 100 via the wireless base unit 201.

More specifically, the control unit 40 in the sensor module 110 generates an advertising packet in which a broadcast address is set as a destination in the MAC header, the MAC address of the sensor module 110 of the cutting tool 100 is set as a source in the MAC header, and an identifier identifying the packet as an advertising packet is set to the field corresponding to a message type, and outputs the generated advertising packet to the transmission unit 30.

The transmission unit 30 in the sensor module 110 transmits a radio signal including the advertising packet received from the control unit 40.

Upon receiving the advertising packet from the sensor module 110 via the wireless base unit 201, the management device 200 sets, as a communication target, the sensor module 110 having the MAC address of the source included in the received advertising packet.

In addition, the management device 200 generates a response packet, which is a response to the received advertising packet, and transmits the generated response packet to the wireless base unit 201.

For example, the management device 200 generates a response packet in which the MAC address of the sensor module 110 is set as a destination in the MAC header, the MAC address of the management device 200 is set as a source in the MAC header, and an identifier identifying the packet as a response packet is set to the field corresponding to a message type, and transmits the generated response packet to the wireless base unit 201.

The wireless base unit 201 transmits a radio signal including the response packet received from the management device 200.

Upon receiving the response packet from the management device 200 via the wireless base unit 201, the transmission unit 30 in the sensor module 110 outputs the received response packet to the control unit 40.

Upon receiving the response packet from the transmission unit 30, the control unit 40 in the sensor module 110 sets, as a communication target, the management device 200 having the MAC address of the source included in the received advertising packet.

In the tool system 300 according to the embodiment of the present disclosure, the cutting tool 100 has a configuration of transmitting a parameter information request to the management device 200, and the management device 200 has a configuration of transmitting, as a response to the received parameter information request, parameter information to the cutting tool 100 via the wireless base unit 201, but the configurations are not limited thereto. The cutting tool 100 may have a configuration of not transmitting a parameter information request to the management device 200. In this case, the management device 200 transmits parameter information addressed to one or more cutting tools 100 via the wireless base unit 201 on a regular or irregular basis regardless of whether a parameter information request has been received.

In the tool system 300 according to the embodiment of the present disclosure, the storage unit 230 in the management device 200 has a configuration of storing parameter information for individual cutting tools 100, but the configuration is not limited thereto. The storage unit 230 may have a configuration of storing parameter information of a single cutting tool 100.

In the cutting tool 100 according to the embodiment of the present disclosure, the reception unit 50 has a configuration of newly receiving parameter information from the management device 200 upon being started up, but the configuration is not limited thereto. The reception unit 50 may have a configuration of not newly receiving parameter information upon being restarted up after receiving parameter information from the management device 200. In this case, the control unit 40 controls an operation of at least either one of the sensor 10 and the data generation unit 20 in accordance with past parameter information stored in the storage unit 70. In addition, the reception unit 50 may have a configuration of newly receiving parameter information form the management device 200 every time the cutting tool 100 starts up. In this specification, startup of the cutting tool 100 means that a workpiece starts being rotated in turning or a tool starts being rotated in milling, before machining on one workpiece starts.

In the cutting tool 100 according to the embodiment of the present disclosure, the reception unit 50 has a configuration of receiving a plurality of chronological pieces of parameter information, but the configuration is not limited thereto. The reception unit 50 may have a configuration of receiving parameter information that does not temporally change.

In the cutting tool 100 according to the embodiment of the present disclosure, the reception unit 50 has a configuration of receiving a plurality of chronological pieces of parameter information that are set in accordance with the types of machining operations chronologically performed by the cutting tool 100, but the configuration is not limited thereto. The reception unit 50 may have a configuration of receiving a plurality of chronological pieces of parameter information that are set in accordance with the same type of machining operation performed by the cutting tool 100.

In the cutting tool 100 according to the embodiment of the present disclosure, the reception unit 50 has a configuration of receiving parameter information including a measurement parameter, a measurement start timing, and a measurement period, but the configuration is not limited thereto. The reception unit 50 may have a configuration of receiving parameter information that does not include at least any one of a measurement parameter, a measurement start timing, and a measurement period.

In the cutting tool 100 according to the embodiment of the present disclosure, the transmission unit 30 has a configuration of wirelessly transmitting measurement information to the management device 200, but the configuration is not limited thereto. The transmission unit 30 may have a configuration of transmitting measurement information to the management device 200 in a wired manner.

In the cutting tool 100 according to the embodiment of the present disclosure, the reception unit 50 has a configuration of receiving parameter information from the management device 200 via the wireless base unit 201, but the configuration is not limited thereto. The reception unit 50 may have a configuration of receiving parameter information from the management device 200 via a wired transmission path.

A technique capable of implementing an excellent function related to estimation of the life of a cutting tool is desired.

For example, a technique capable of mounting a sensor in the cutting tool 100 and estimating the life of a tool such as a cutting insert on the basis of a measurement result of the sensor is desired.

In the technique as described above, an optimum parameter related to measurement by the sensor varies according to a machining condition, such as a rotation speed of a workpiece or a cutting tool, and a machining step. However, in the case of continuously performing a plurality of types of machining operations in a machining device, it is difficult to stop the machining device and optimize a parameter related to measurement by the sensor for the cutting tool 100 during the machining operations.

If an optimum parameter related to measurement by the sensor is uniformly set to the sensor of each cutting tool 100, a case may occur in which measurement is performed with an excessive sampling period and an excessive measurement range. As a result, current consumption of the sensor increases. In addition, in the system of wirelessly transmitting a measurement result, radio traffic may increase.

In contrast, in the cutting tool 100 according to an embodiment of the present disclosure, the cutting insert 1 has a cutting edge. The holder 2 holds the cutting insert 1. The sensor 10 is provided in the holder 2. The information communication unit 80 is provided in the holder 2. The information communication unit 80 transmits an inquiry for parameter information related to measurement by the sensor 10 to the management device 200 provided outside the cutting tool 100, and acquires the parameter information from the management device 200.

With this configuration of transmitting an inquiry for parameter information related to measurement by the sensor 10 to the management device 200 provided outside the cutting tool 100 and acquiring the parameter information from the management device 200, for example, measurement by the sensor 10 can be performed in accordance with the parameter information that is set in accordance with details of machining using the cutting tool 100. Thus, an increase in current consumption of the sensor 10 can be suppressed while highly accurate measurement is performed using the sensor 10. As a result, for example, the frequency of replacing a battery and performing charging can be decreased in the sensor 10. In addition, in a system of wirelessly transmitting a measurement result of the sensor 10, an increase in data amount of the measurement result can be suppressed, and thus, for example, interference of radio signals caused by an increase in radio traffic can be suppressed.

Thus, in the cutting tool 100 according to the embodiment of the present disclosure, an excellent function related to estimation of the life of the cutting tool can be implemented.

In the cutting tool 100 according to the embodiment of the present disclosure, the information communication unit 80 acquires the parameter information upon being started up.

With this configuration, for example, in the cutting tool 100 that is to perform a different type of machining operation every time the cutting tool 100 is started up, parameter information that is set in accordance with details of the machining operation can be acquired.

In the cutting tool 100 according to the embodiment of the present disclosure, the information communication unit 80 acquires a plurality of chronological pieces of parameter information.

With this configuration, for example, a measurement parameter of the sensor 10 can be chronologically changed, and measurement by the sensor 10 can be appropriately performed when the cutting tool 100 performs various types of machining operations.

In the cutting tool 100 according to the embodiment of the present disclosure, the information communication unit 80 acquires the plurality of chronological pieces of parameter information that are set in accordance with types of machining operations chronologically performed by the cutting tool 100.

With this configuration, when the type of machining operation using the cutting tool 100 chronologically changes, parameter information that is set in accordance with each type of machining operation can be acquired, and measurement by the sensor 10 can be appropriately performed.

In the cutting tool 100 according to the embodiment of the present disclosure, the information communication unit 80 acquires the parameter information including a measurement parameter, a measurement start timing, and a measurement period.

With this configuration, the measurement parameter, the measurement start timing, and the measurement period of the sensor 10 can be controlled on the basis of the parameter information, and thus an increase in current consumption of the sensor 10, an increase in data amount of a measurement result, and the like can be suppressed more reliably.

In the cutting tool 100 according to the embodiment of the present disclosure, the control unit 40 is provided in the holder 2 and controls an operation of the sensor 10. The storage unit 70 is provided in the holder 2. In response to the parameter information acquired by the information communication unit 80 does not include at least any one of a measurement parameter, a measurement start timing, and a measurement period related to the measurement by the sensor 10, the control unit 40 controls the operation of the sensor 10 by using information on a corresponding one of the measurement parameter, the measurement start timing, and the measurement period stored in the storage unit 70 in advance.

With this configuration, even when the contents of the acquired parameter information are insufficient, the operation of the sensor 10 can be controlled by using the information stored in the storage unit 70.

In the cutting tool 100 according to an embodiment of the present disclosure, the cutting insert 1 has a cutting edge. The holder 2 holds the cutting insert 1. The sensor 10 is provided in the holder 2 and includes at least either one of an acceleration sensor and a strain sensor. The information communication unit 80 provided in the holder 2 transmits an inquiry for parameter information related to measurement by the sensor 10 to the management device 200 provided outside the cutting tool 100, and acquires the parameter information. The storage unit 70 provided in the holder 2 stores the parameter information. The control unit 40 is provided in the holder 2. The information communication unit 80 transmits the inquiry for the parameter information to the management device 200 and acquires the parameter information having contents that are based on the inquiry from the management device 200, upon being started up.

With this configuration of transmitting an inquiry for parameter information related to measurement by the sensor 10 including an acceleration sensor or a strain sensor to the management device 200 provided outside the cutting tool 100 and acquiring the parameter information from the management device 200, for example, measurement by the sensor 10 can be performed in accordance with the parameter information that is set in accordance with details of machining using the cutting tool 100. Thus, an increase in current consumption of the sensor 10 can be suppressed while highly accurate measurement is performed using the sensor 10. As a result, for example, the frequency of replacing a battery and performing charging can be decreased in the sensor 10. In addition, in a system of wirelessly transmitting a measurement result of the sensor 10, an increase in data amount of the measurement result can be suppressed, and thus, for example, interference of radio signals caused by an increase in radio traffic can be suppressed. Furthermore, in the cutting tool 100 that is to perform a different type of machining operation every time the cutting tool 100 is started up, parameter information that is set in accordance with details of the machining operation can be acquired by transmitting an inquiry for the parameter information to the management device 200 every time the cutting tool 100 is started up.

Thus, in the cutting tool 100 according to the embodiment of the present disclosure, an excellent function related to estimation of the life of the cutting tool can be implemented.

In the tool system 300 according to an embodiment of the present disclosure, the cutting tool 100 includes the cutting insert 1 having a cutting edge, the holder 2 holding the cutting insert 1, the sensor 10 provided in the holder 2, and the information communication unit 80 provided in the holder 2. The management device 200 provided outside the cutting tool 100 transmits, to the information communication unit 80, parameter information related to measurement by the sensor 10.

With this configuration in which the management device 200 provided outside the cutting tool 100 transmits parameter information related to measurement by the sensor 10 to the information communication unit 80 in the cutting tool 100, for example, measurement by the sensor 10 can be performed in accordance with the parameter information that is set in accordance with details of machining using the cutting tool 100. Thus, an increase in current consumption of the sensor 10 can be suppressed while highly accurate measurement is performed using the sensor 10. As a result, for example, the frequency of replacing a battery and performing charging can be decreased in the sensor 10. In addition, in the system of wirelessly transmitting a measurement result of the sensor 10, an increase in data amount of the measurement result can be suppressed, and thus, for example, interference of radio signals caused by an increase in radio traffic can be suppressed.

Thus, in the tool system 300 according to the embodiment of the present disclosure, an excellent function related to estimation of the life of the cutting tool can be implemented.

In the tool system 300 according to the embodiment of the present disclosure, the information communication unit 80 transmits an inquiry for the parameter information to the management device 200 upon being started up. The management device 200 transmits, to the information communication unit 80, the parameter information having contents that are based on the inquiry from the information communication unit 80.

With this configuration, for example, in the tool system 300 including the cutting tool 100 that is to perform a different type of machining operation every time the cutting tool 100 is started up, the information communication unit 80 transmits an inquiry for parameter information to the management device 200 every time the information communication unit 80 is started up, and thus parameter information that is set in accordance with details of a machining operation in the cutting tool 100 can be transmitted from the management device 200 to the cutting tool 100.

In the tool system 300 according to the embodiment of the present disclosure, in response to the management device 200 does not include the parameter information for the cutting tool 100, the management device 200 controls displaying a configuration screen prompting setting of the parameter information.

With this configuration, even when the management device 200 does not hold parameter information for the cutting tool 100, setting of parameter information by a user can be prompted, and the set parameter information can be transmitted to the cutting tool 100.

The tool system 300 according to the embodiment of the present disclosure includes a plurality of cutting tools 100. The management device 200 holds, for each of the plurality of cutting tools 100, the parameter information including a measurement parameter, a measurement start timing, and a measurement period.

With this configuration, various machining operations can be appropriately performed by using the plurality of cutting tools 100, and the measurement parameter, the measurement start timing, and the measurement period of the sensor 10 in each cutting tool 100 can be controlled on the basis of the parameter information. Thus, an increase in current consumption of the sensor 10 in each cutting tool 100, an increase in data amount of a measurement result, and the like can be suppressed more reliably.

In the tool system 300 according to the embodiment of the present disclosure, the cutting tool 100 further includes the control unit 40 that controls an operation of the sensor 10, and the storage unit 70. In response to the parameter information transmitted from the management device 200 to the information communication unit 80 does not include at least any one of a measurement parameter, a measurement start timing, and a measurement period related to the measurement by the sensor 10, the control unit 40 controls the operation of the sensor 10 by using information on a corresponding one of the measurement parameter, the measurement start timing, and the measurement period stored in the storage unit 70 in advance.

With this configuration, even when the contents of the parameter information transmitted from the management device 200 to the reception unit 50 in the cutting tool 100 are insufficient, the operation of the sensor 10 can be controlled in the cutting tool 100 by using the information stored in the storage unit 70.

A communication method according to an embodiment of the present disclosure is a communication method for the tool system 300 including the cutting tool 100 and the management device 200, the cutting tool 100 including the holder 2 holding the cutting insert 1 having a cutting edge, and the sensor 10 provided in the holder 2. In this communication method, first, the management device 200 and the cutting tool 100 establish a communication connection with each other. Subsequently, the management device 200 transmits parameter information related to measurement by the sensor 10 to the cutting tool 100.

With this method of transmitting parameter information related to measurement by the sensor 10 from the management device 200 to the cutting tool 100, for example, measurement by the sensor 10 can be performed in accordance with the parameter information that is set in accordance with details of machining using the cutting tool 100. Thus, an increase in current consumption of the sensor 10 can be suppressed while highly accurate measurement is performed using the sensor 10. As a result, for example, the frequency of replacing a battery and performing charging can be decreased in the sensor 10. In addition, in the system of wirelessly transmitting a measurement result of the sensor 10, an increase in data amount of the measurement result can be suppressed, and thus, for example, interference of radio signals caused by an increase in radio traffic can be suppressed.

Thus, in the communication method according to the embodiment of the present disclosure, an excellent function related to estimation of the life of the cutting tool can be implemented.

In the holder 2 according to an embodiment of the present disclosure, the fixing members 3A, 3B, and 3C hold the cutting insert 1. The information communication unit 80 transmits an inquiry for parameter information related to measurement by the sensor 10 to the management device 200 provided outside the cutting tool 100 and acquires the parameter information from the management device 200.

With this configuration of transmitting an inquiry for parameter information related to measurement by the sensor 10 to the management device 200 provided outside the cutting tool 100 and acquiring the parameter information from the management device 200, for example, measurement by the sensor 10 can be performed in accordance with the parameter information that is set in accordance with details of machining using the cutting tool 100. Thus, an increase in current consumption of the sensor 10 can be suppressed while highly accurate measurement is performed using the sensor 10. As a result, for example, the frequency of replacing a battery and performing charging can be decreased in the sensor 10. In addition, in a system of wirelessly transmitting a measurement result of the sensor 10, an increase in data amount of the measurement result can be suppressed, and thus, for example, interference of radio signals caused by an increase in radio traffic can be suppressed.

Thus, in the holder 2 according to the embodiment of the present disclosure, an excellent function related to estimation of the life of the cutting tool can be implemented.

In the holder 2 according to the embodiment of the present disclosure, the information communication unit 80 acquires the parameter information upon being started up.

With this configuration, for example, in the cutting tool 100 that is to perform a different type of machining operation every time the cutting tool 100 is started up, parameter information that is set in accordance with details of the machining operation can be acquired.

In the holder 2 according to the embodiment of the present disclosure, the information communication unit 80 acquires a plurality of chronological pieces of parameter information.

With this configuration, for example, a measurement parameter of the sensor 10 can be chronologically changed, and measurement by the sensor 10 can be appropriately performed when the cutting tool 100 performs various types of machining operations.

In the holder 2 according to the embodiment of the present disclosure, the information communication unit 80 acquires the plurality of chronological pieces of parameter information that are set in accordance with types of machining operations chronologically performed by the cutting tool 100.

With this configuration, when the type of machining operation using the cutting tool 100 chronologically changes, parameter information that is set in accordance with each type of machining operation can be acquired, and measurement by the sensor 10 can be appropriately performed.

In the holder 2 according to the embodiment of the present disclosure, the information communication unit 80 acquires the parameter information including a measurement parameter, a measurement start timing, and a measurement period.

With this configuration, the measurement parameter, the measurement start timing, and the measurement period of the sensor 10 can be controlled on the basis of the parameter information, and thus an increase in current consumption of the sensor 10, an increase in data amount of a measurement result, and the like can be suppressed more reliably.

In the holder 2 according to the embodiment of the present disclosure, the control unit 40 controls an operation of the sensor 10. In response to the parameter information acquired by the information communication unit 80 does not include at least any one of a measurement parameter, a measurement start timing, and a measurement period related to the measurement by the sensor 10, the control unit 40 controls the operation of the sensor 10 by using information on a corresponding one of the measurement parameter, the measurement start timing, and the measurement period stored in the storage unit 70 in advance.

With this configuration, even when the contents of the acquired parameter information are insufficient, the operation of the sensor 10 can be controlled by using the information stored in the storage unit 70.

The above-described embodiments are to be considered as examples and non-restrictive in all aspects. The scope of the present invention is indicated not by the above description but by the claims, and is intended to include all changes within the meaning and scope equivalent to the claims.

The above description includes the features given below.

[Appendix 1]

A cutting tool including:
a holder holding an insert having a cutting edge;
a sensor provided in the holder; and
an acquisition unit that acquires parameter information related to measurement by the sensor from a management device outside the cutting tool, wherein
the acquisition unit acquires, as the parameter information, a sampling period and a measurement range of the sensor.

[Appendix 2]

A tool system including:
a cutting tool including a holder holding an insert having a cutting edge, and a sensor provided in the holder; and
a management device, wherein
the management device transmits parameter information related to measurement by the sensor to the cutting tool, and
the management device transmits, as the parameter information, a sampling period and a measurement range of the sensor.

REFERENCE SIGNS LIST 1, 1A cutting insert
3A, 3B, 3C fixing member
2, 2A holder
10 sensor
20 data generation unit
30 transmission unit
40 control unit
50 reception unit
60 battery
70 storage unit
80 information communication unit
100 cutting tool
110 senor module
200 management device
210 communication unit
220 processing unit
230 storage unit
240 acceptance unit
201 wireless base unit
300 tool system
401 sensor packet

The invention claimed is:
1. A cutting tool comprising:
a cutting insert having a cutting edge;
a holder holding the cutting insert;
a sensor provided in the holder; and an information communication circuitry provided in the holder, configured to transmit an inquiry for parameter information related to measurement by the sensor to a management device provided outside the cutting tool, and acquire the parameter information from the management device.

2. The cutting tool according to claim 1, wherein the information communication unit is configured to acquire the parameter information upon being started up.

3. The cutting tool according to claim 1, wherein the information communication unit is configured to acquire a plurality of chronological pieces of parameter information each of which is the parameter information.

4. The cutting tool according to claim 3, wherein the information communication circuitry is configured to acquire the plurality of chronological pieces of parameter information that are set in accordance with types of machining operations chronologically performed by the cutting tool.

5. The cutting tool according to claim 1, wherein the information communication circuitry is configured to acquire the parameter information including a measurement parameter, a measurement start timing, and a measurement period.

6. The cutting tool according to claim 1, further comprising:

a control circuitry is provided in the holder, configured to control an operation of the sensor; and a memory provided in the holder, wherein in response to the parameter information acquired by the information communication circuitry not including at least any one of a measurement parameter, a measurement start timing, and a measurement period related to the measurement by the sensor, the control circuitry is configured to control the operation of the sensor by using information on a corresponding one of the measurement parameter, the measurement start timing, and the measurement period stored in the memory in advance.

* * * * *